UNITED STATES PATENT OFFICE.

WILHELM BAUER, OF VOHWINKEL, AND ALFRED HERRE AND RUDOLF MAYER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYESTUFFS.

1,101,778.   Specification of Letters Patent.   Patented June 30, 1914.

No Drawing.   Application filed June 20, 1913.   Serial No. 774,897.

*To all whom it may concern:*

Be it known that we, WILHELM BAUER, ALFRED HERRE, and RUDOLF MAYER, doctors of philosophy, chemists, citizens of the German Empire, residing at, respectively, Vohwinkel and Elberfeld, Germany, have invented new and useful Improvements in New Vat Dyestuffs, of which the following is a specification.

The present invention relates to the manufacture and production of new and valuable vat dyestuffs.

The new dyes are obtained by condensation of derivatives of halogen substituted 2.3-naphthisatins (in which the oxygen of the alpha-keto group is replaced by easily movable or replaceable substituents, *e. g.* halogen, sulfur, the amino group, the alkoxy group) with components such as are in use for the production of indigoid dyes *e. g.*, 4-chloro-1-naphthol, alpha-anthrol, oxythionaphthene, 5.7-dibromoindoxyl, oxyanthranol, carbazol, etc.

The new dyes are after being dried and pulverized dark powders soluble in concentrated sulfuric acid generally with a bluish to green coloration and dyeing cotton from the hydrosulfite vat from red to blue to green fast shades. They have most probably the following general formula:

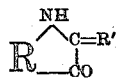

R being a naphthalene radical containing halogen; R' being an indigoid dyestuff component containing the group —CH$_2$CO— or —CH=COH—.

The new halogenated naphthisatins having most probably the formula:

R being a halogenated naphthalene ring, are produced by treating alpha-alpha-di- halogen-beta-hydrocyanocarbo-dinaphthylimid of the formula graphically represented:

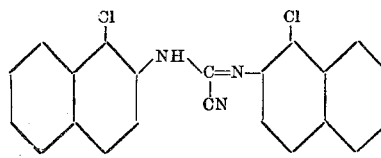

with anhydrous aluminium chlorid and by saponifying the resulting intermediate products.

In order to illustrate the new process more fully the following examples are given, the parts being by weight:

Example 1: 230 parts of 1-chloro-2.3-naphthisatin (M. P. 258—259° C.) are converted into the alpha-chlorid on being heated to 110° C. with 240 parts of PCl$_5$ and 5000 parts of chlorobenzene. The mixture thus obtained is poured while still warm into a solution which is well stirred of 240 parts of alpha-anthrol in chlorobenzene. The dye which separates on cooling is filtered off, washed and dried. Yield 90 per cent. of the theory. It is a greenish-blue crystalline powder soluble in hot nitrobenzene with a pure greenish-blue and in concentrated sulfuric acid with a greenish color having most probably the following formula:

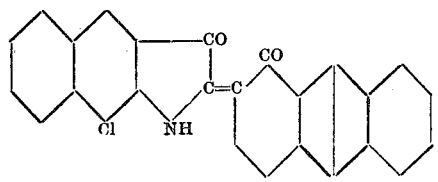

By treatment with hydrosulfite and NaOH a reddish-brown vat results from which cotton can be dyed in shades changing on exposure to air into a pure fast greenish-blue. Instead of the alpha-chlorid mentioned other chlorids can be used *e. g.* the alpha-chlorid of bromo-1-chloro-2.3-naphthisatin.

Example 2: 341 parts of chloro-1-chloro- 2.3-naphthisatin-alpha-anilid (obtained by the action of anilin on chloro-1-chloro-2.3-naphthisatin-alpha-chlorid (black needles M. P. 200° C.) and 250 parts of alpha-anthrol are suspended in 7000 parts of acetic acid anhydrid and the mixture is heated to 100° C. for 1 hour while the mixture is being well stirred. The dye is filtered off, washed and dried. It is a blue crystalline powder showing a metallic luster, soluble in hot nitrobenzene with a greenish-blue and in concentrated sulfuric acid with a greenish-blue coloration. It dies cotton from the vat in greenish-blue shades.

In the following table the properties of some of the new dyestuffs are given:—

| Dyestuff obtained from— | Appearance. | Solution in— | | Shade on cotton. |
|---|---|---|---|---|
| | | Nitro-benzene. | Concentrated sulfuric acid. | |
| Chloro-1-chloro-2.3-naphthisatin-chlorid+4-chloro-1-naphthol. | Gray-blue crystalline powder | Blue | Blue | Dark blue. |
| Bromo-1-chloro-2.3-naphthisatin chlorid+4-chloro-1-naphthol. | Gray-blue crystalline powder | Blue | Blue | Greenish-blue. |
| Chloro-1-chloro-2.3-naphthisatin chlorid+oxythionaphthene. | Blue-violet needles | Blue | Blue | Pure blue. |
| Chloro-1-chloro-2.3-naphthisatin chlorid+5.7-dibromoindoxyl. | Dark blue powder with a cupric luster | Blue | Blue | Greenish-blue. |
| Chloro-1-chloro-2.3-naphthisatin chlorid+4-methoxy-1-anthrol. | Gray-green powder | Bluish-green | Olive-green | Green. |
| Chloro-1-chloro-2.3-naphthisatin anilid+oxyanthranol. | Greenish-black needles with a cupric luster. | Bluish-green | Blue | Green. |
| Chloro-1-chloro-2.3-naphthisatin chlorid+carbazole. | Bordeaux-red needles | Fuchsin-red | Violet-blue | Bordeaux-red. |
| Bromo-1-chloro-2.3-naphthisatin chlorid+carbazole. | Bordeaux-red needles | Fuchsin-red | Violet-blue | Red-violet. |

We claim:—

1. The new vat dyestuffs being derived from 2.3-naphthisatins, which are after being dried and pulverized dark powders soluble in concentrated sulfuric acid with a bluish to green coloration, having most probably the following general formula:

in which R represents a naphthalene nucleus containing halogen and R' the nucleus of an indigoid dyestuff component and dyeing cotton from the hydrosulfite vat from red to blue to green fast shades, substantially as described.

2. The new vat dyestuffs being derived from 2.3-naphthisatins, which are after being dried and pulverized dark powders soluble in concentrated sulfuric acid with a bluish to green coloration, having most probably the following general formula:

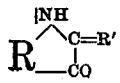

in which R represents an alpha-chlor-naphthalene nucleus and R' the nucleus of an indigoid dyestuff component; and dyeing cotton from the hydrosulfite vat from red to blue to green fast shades, substantially as described.

3. The new vat dyestuffs being derived from 2.3-naphthisatins, which are after being dried and pulverized dark powders soluble in concentrated sulfuric acid with a bluish to green coloration, having most probably the following general formula:

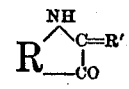

in which R represents a chlor substituted naphthalene nucleus and R' the nucleus of an indigoid dyestuff component; and dyeing cotton from the hydrosulfite vat from red to blue to green fast shades, substantially as described.

4. The new vat dyestuffs being derived from 2.3-naphthisatins, which are after being dried and pulverized dark powders soluble in concentrated sulfuric acid with a bluish to green coloration, having most probably the following general formula:

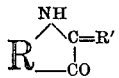

in which R represents a naphthalene nucleus containing halogen and R' the nucleus of an indigoid component of the anthracene series and dyeing cotton from the hydrosulfite vat from red to blue to green fast shades, substantially as described.

5. The new vat dyestuffs being derived from 2.3-naphthisatins, which are after being dried and pulverized dark powders soluble in concentrated sulfuric acid with a bluish to green coloration, having most probably the following general formula:

in which R represents an alpha-chlor-naphthalene nucleus and R' the nucleus of an indigoid dyestuff component of the anthracene series and dyeing cotton from the hydrosulfite vat from red to blue to green fast shades substantially as described.

6. The new vat dye being the condensation product of 1-chloro-2.3-naphthisatin and alpha-anthrol having most probably the formula:

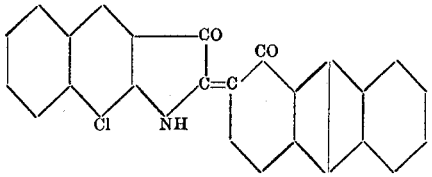

being after being dried and pulverized a greenish-blue crystalline powder soluble in hot nitrobenzene with a pure greenish-blue and in concentrated sulfuric acid with a greenish color; yielding after treatment with hydrosulfite and NaOH a reddish-brown vat from which cotton is dyed in shades changing on exposure to air into a pure fast greenish-blue, substantially as described.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
HELEN NUFER,
ALBERT NUFER.